United States Patent Office 2,985,037
Patented May 23, 1961

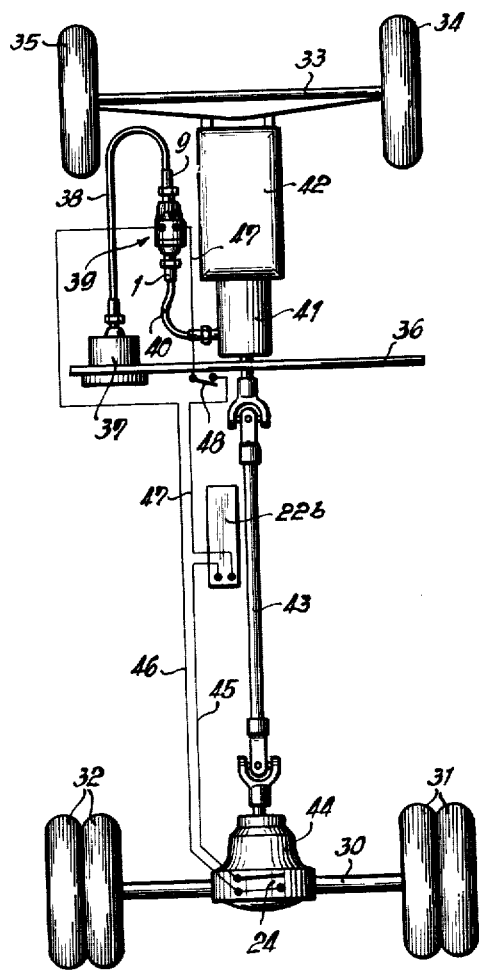

2,985,037
TRANSMISSION FOR TACHOMETRIC DEVICES

August Schoenle, Schwenningen (Neckar), and Walter Heyde, Villingen, Black Forest, Germany, assignors to Kienzle Apparate G.m.b.H., Villingen, Black Forest, Germany Filed Nov. 6, 1959, Ser. No. 851,386

Claims priority, application Germany, Nov. 8, 1958

15 Claims. (Cl. 74—781)

The present invention relates to a transmission for a tachometric device, such as a tachometer or tachograph. More particularly, the present invention relates to a shiftable transmission for driving a tachometric device at different speeds corresponding to different speeds of a vehicle shaft.

As a general rule, tachometric devices are driven from the transmission of the vehicle, since the rotary speed of the drive shaft of the transmission is related to the rotary speed of the wheels in a constant ratio. This is not the case in vehicles in which the rear shaft is driven through a shiftable transmission for obtaining two different speeds of the rear wheels.

Consequently, it is necessary to provide a shiftable transmission for a tachometric device used in a vehicle of this type. The known shiftable transmissions for driving tachometric devices have the disadvantage that they employ coupling means which produce an incorrect indication of the tachometric device at the moment of shifting. Sometimes a higher speed, and sometimes a lower speed than the actual rotary speed of the wheels, is indicated by the known shiftable tachometric devices according to the prior art.

It is one object of the present invention to provide a shiftable transmission for tachometric devices which is free of the disadvantages of corresponding devices according to the prior art.

Another object of the present invention is to provide a shiftable transmission including coupling means employing coupling balls.

Another object of the present invention is to provide a shiftable transmission for a tachometric device, which in one shifted position connects a drive shaft with the tachometer shaft through a gear transmission, and in the other shifted position directly connects the drive shaft to the tachometer shaft.

It is also an object of the present invention to provide a shiftable transmission including a planetary gear arrangement and ball coupling means and operating in a particularly efficient and reliable manner.

With these objects in view, one embodiment of the present invention is a shiftable transmission for driving a tachometric device at different speeds corresponding to different speeds of a vehicle shaft. The shiftable transmission mainly comprises a drive shaft adapted to be driven from the vehicle shaft, a tachometer shaft, transmission means connecting the drive shaft with the tachometer shaft for rotating the tachometer shaft at a first speed, and, preferably electromagnetic, coupling means shiftable between a disconnected position and a coupling position for directly coupling the tachometer shaft to the drive shaft so that the tachometer shaft is rotated at a second different speed. The coupling means preferably include coupling balls and recessed means receiving the coupling balls in the coupling position of the coupling means.

The ratio of the transmission means can be selected in accordance with the prevailing conditions, so that the tachometer shaft may rotate faster or slower than the drive shaft.

It has been found to be of great advantage to arrange the balls and the corresponding recesses at a substantial radial distance from the axis of the tachometer shaft. In the preferred embodiment of the present invention, the coupling means includes a bell-shaped coupling member having a circular portion with openings in which the coupling balls are located. When the bell-shaped coupling member is shifted in axial direction, the balls engage corresponding coupling recesses in a circular portion of another bell-shaped coupling member. The radius of the circular portions is at least twice the radius of the associated shaft.

Preferably, a circular stepped guide surface surrounds the circular portion holding the balls, so that the balls are guided into the coupling recesses when the coupling means is shifted.

In the preferred embodiment of the present invention, the coupling means is shifted by electromagnetic means which are energized by a switch actuated upon shifting of the transmission which effects rotation of the rear wheels at different speeds. Consequently, the tachometric device is automatically set to the proper speed when the vehicle transmission is shifted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a schematic view of the general arrangement of the transmission device according to the invention.

Figure 1:
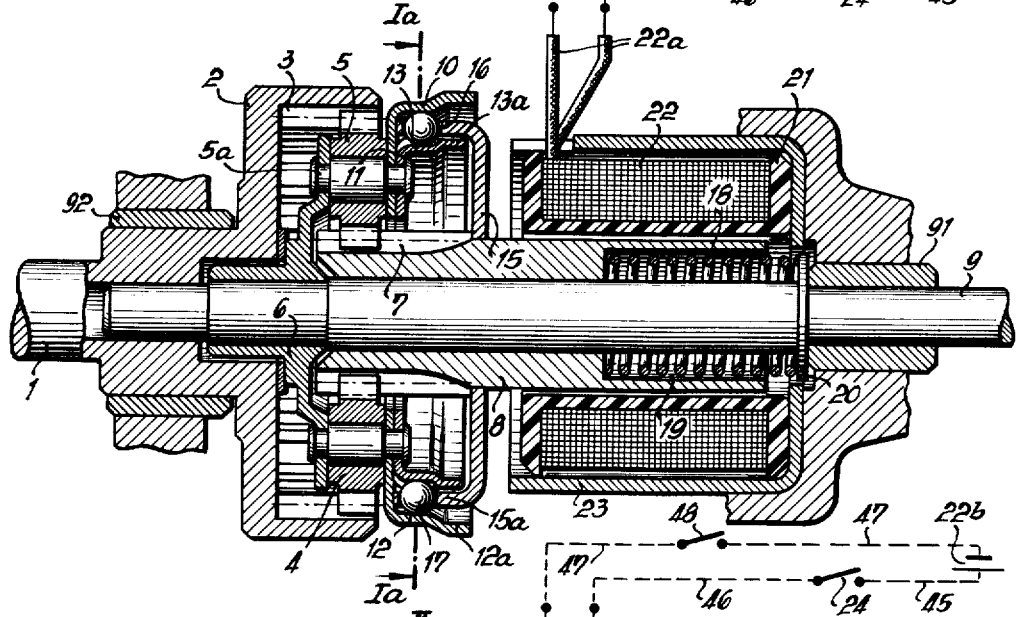
Fig. 1 is an axial sectional view of a preferred embodiment of the present invention in a first position in which the drive shaft is directly coupled to the tachometer shaft.

Referring first to the general view of Fig. 3, there is shown the chassis of a vehicle having the rear axle 30 bearing and driving the rear wheels 31, 32 and the front axle 33 bearing the front wheels 34, 35. Arranged on the dash board 36 of the vehicle is the tachometer 37 which is driven by a flexible cable 38. The flexible cable 38 is connected to a driven shaft 9 of the transmission device 39 according to the invention. The drive shaft 1 of the transmission device 39 is connected via another flexible cable 40 to the change speed gear of the vehicle which is housed in the vehicle gear box 41. The change speed gear 41 is driven by the motor 42. The change speed gear drives the rear axle 30 over the drive shaft 43 and another change speed gear 44 for the rear axle 30. There is a vehicle battery 22b which is connected over a line 45 to the switch 24. The switch 24 is connected over another line 46 to a magnetic coil 22 (Figs. 1 and 2) which is housed in the transmission device 39. An electric line 47 connects the coil 22 to another switch 48 which is arranged on the vehicle dash board 36. The switch 48 serves to switch the change speed gear 44 for the rear axle 30.

Figure 2:
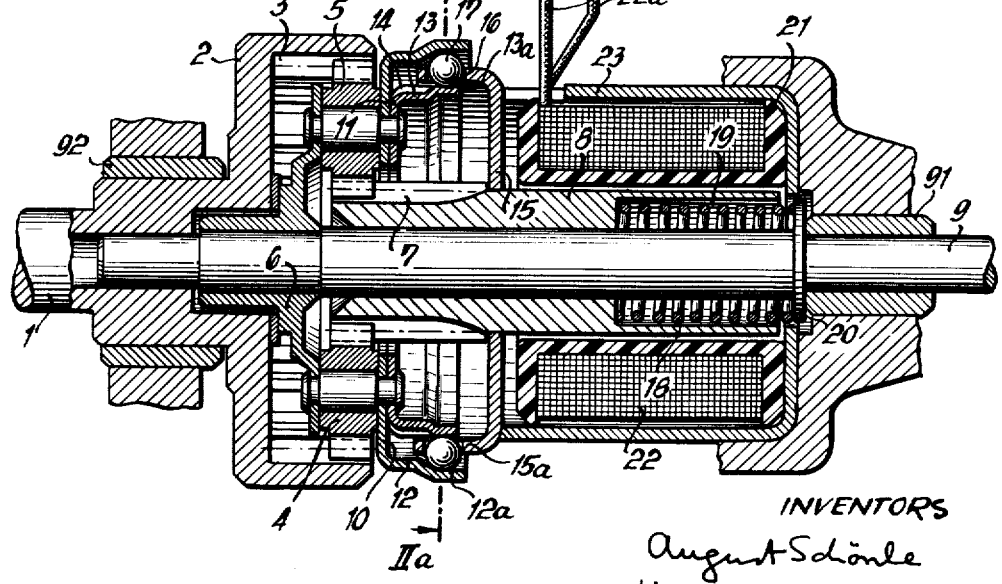
Fig. 2 is an axial sectional view through the embodiment of Fig. 1 illustrating the device in another position in which the tachometer shaft is driven through a gear transmission.

Referring now to Figs. 1 and 2, a drive shaft 1 is connected to a shaft of the vehicle, and carries an orbit member 2 which has an inner gear 3. A tachometer shaft 9 is arranged coaxial with the drive shaft 1 and has a portion projecting into a bearing surface in members 1 and 2. A carrier member 6 is secured to shaft 9 for rotation therewith, and turnably supports a plurality of planetary gear means 4 and 5. Carrier member 6 is located within the circular flange of member 2, so that planetary gears 4 and 5 mesh with the orbit gear 3. A tubular member 8 is mounted on shaft 9 for turning movement and for movement in axial direction, and has a gear portion 7 constituting a sun gear for the planetary gears 4 and 5 and meshing with the same. Since the gear teeth of sun gear portion 7 are longer in axial direction then the gear teeth of the planetary gears 4 and 5, they remain in meshing engagement with the planetary gears in the axially shifted positions of member 8 shown in Figs. 1 and 2. A bell-shaped member 10, and a bell-shaped member 11 are secured to the carrier member 6 and turn with the same. Members 10 and 11 have concentric circular portions. The circular portion 13 of member 11 has circumferentially spaced recesses 14 and adjacent thereto a smooth circular surface 13a. The circular portion of member 10 is stepped and has an inner circular guide face 12 of greater diameter, and an inner circular guide face 12a of smaller diameter.

Another bell-shaped member 15 is secured to tubular member 8 for turning movement about shaft 9, and also for axial movement along shaft 9. Bell-shaped member 15 has a circular portion 15a formed with circumferentially spaced openings 16 in which rolling means, shown to be balls 17 are located.

Since circular portion 15a is located within the space defined by circular portion 13 and surfaces 12, 12a, the balls 17 are located in the recesses 14 and engage the guide surface 12a in the position of Fig. 1, and are located on the smooth circular surface 13a in engagement with the inner surface 12 when members 8, 15 are axially shifted to the position illustrated in Fig. 2. The stepped surface 12, 12a helps to guide the balls into the recesses 14 when the coupling member 8, 15, 17 is shifted from the disconnected position shown in Fig. 2 to the coupling position shown in Fig. 1 in which parts 10, 11 are connected by balls 17 and recesses 14 to coupling member 15, 8.

The tubular part 8 has an extension surrounded by the winding 22 of an electromagnetic means, and constitutes its armature. The tubular portion 8 has a recess 19 in which a coil spring 18 is located. The end of coil spring 18 abuts on abutment 20 on shaft 9 adjacent a bearing 91. Member 2 is mounted on a similar bearing 92.

Figure 1A:
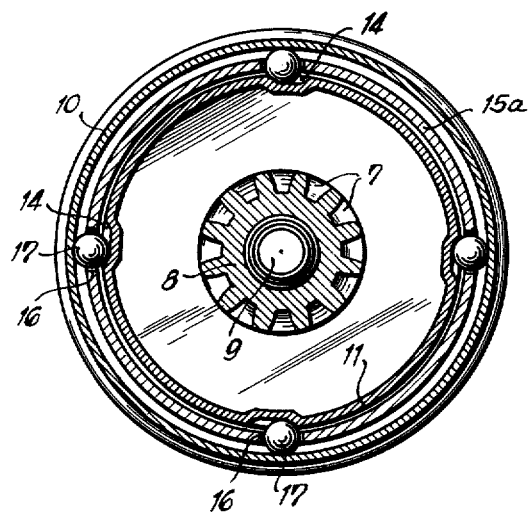
Fig. 1a is a cross-sectional view taken on line I—I in Fig. 1.

A stationary casing 23 envelops the winding 22, and an insulating body 21 supports the winding 22. A slot is provided in casing 23 through which a pair of terminal wires 22a pass. These wires are connected into a circuit including a battery 22b, and a switch 24 which is controlled by the shiftable transmission elements by which the rear shaft means of the vehicle are shifted to obtain different rotary speeds of the rear wheels. When electromagnetic winding 22 is energized by closing of switch 24, an electromagnetic force pulls the armature extension of member 8 to the right as viewed in the drawing so that spring 18 is compressed, and coupling member 8, 15, 17 moves to the position shown in Fig. 2. When switch 24 is opened, corresponding to a different speed of the rear wheels, electromagnetic winding 22 is de-energized, and spring 18 shifts coupling member 8, 15, 17 in axial direction to the left as viewed in the drawing and into the position shown in Fig. 1. A shiftable transmission of the present invention operates as follows:

In a first stage of a transmission of the vehicle from which the rear shaft is driven, switch 24 is released and opens automatically. Consequently spring 18 is effective, and the transmission is in the coupled position shown in Figs. 1 and 1a. The balls 17 are located in the recesses 14, so that coupling member 8, 15, 17 is coupled for rotation with carrier member 6 which is fixedly secured to the tachometer shaft on which the tachometric device is mounted. Since member 6 cannot turn relative to shaft 9, part 8, and the sun gear 7 thereon is blocked. Consequently, planetary gear means 4 and 5 cannot turn when the orbit gear 3 is turned by shaft 1, and the torque is transmitted through orbit gear 3, blocked planetary gears 5, and carrier member 6 to shaft 9 so that shaft 9 is directly coupled to shaft 1 and rotates at the same speed.

Figure 2A:
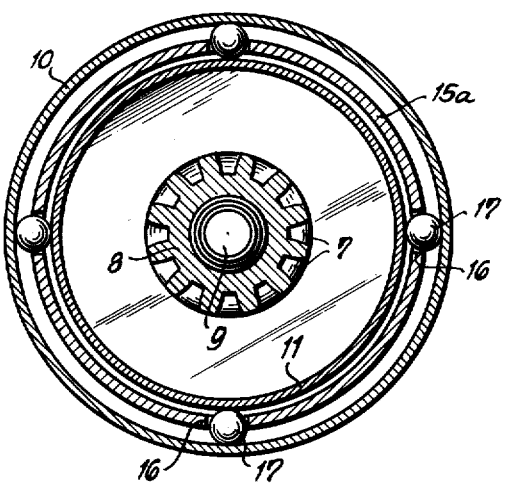
Fig. 2a is a cross-sectional view taken on line II—II in Fig. 2.

When the rear shaft of the vehicle is set to a different rotary speed by shifting the associated transmission of the vehicle, an element of the transmission closes switch 24, as shown in Fig. 2. The winding 22 is energized, and attracts the armature member 8 so that spring 18 is compressed, and the elements assume the position shown in Figs. 2 and 2a.

Since coupling part 15 moves to the right, balls 17 are now located between two smooth guide surfaces 13a and 12, and the coupling is disconnected since the balls 17 are no longer located in the recesses 14, but can freely roll on the circular guide surfaces 13a and 12. At the same time, a portion of coupling part 15 engages the stationary member 23, and is blocked by the same due to the pressure exerted by the electromagnetic means. Since coupling part 15 is fixedly connected to tubular member 8, the sun gear portion 7 is blocked and cannot rotate.

Shaft 1 turns the orbit gear 3, and since sun gear 7 is blocked, planetary gears 4 and 5 roll around the sun gear 7 effecting rotation of carrier member 6 which is fixedly secured to tachometer shaft 9 which operates the tachometer at a different rotary speed determined by the transmission ratio of the transmission 3, 5, 7.

It will be understood that each of the elements described above, or two or more together, may also find a useful application in other types of transmissions differing from the types described above.

While the invention has been illustrated and described as embodied in a shiftable transmission for a tachometric device including a ball coupling and a planetary gear transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Shiftable transmission for driving a tachometric device at different speeds corresponding to different speeds of a vehicle shaft, comprising, in combination, a drive shaft; a tachometer shaft; transmission means connecting said shafts for rotating said tachometer shaft at a first speed; and coupling means shiftable between a disconnected position and a coupling position for directly coupling said shafts to rotate said tachometer shaft at a second speed, said coupling means including coupling balls and recessed means receiving said coupling balls in said coupling position.

2. Shiftable transmission for driving a tachometric device at different speeds corresponding to different speeds of a vehicle shaft, comprising, in combination, a drive shaft; a tachometer shaft; transmission means connecting said shafts for rotating said tachometer shaft at a first speed; and coupling means shiftable between a disconnected position; an intermediate position, and a coupling position for directly coupling said shafts to rotate said tachometer shaft at a second speed, said coupling means including coupling balls and recessed means receiving said coupling balls in said coupling position, and means in contact with said coupling balls in said intermediate position for gradually increasing the speed of said tachometer shaft to approach the speed of said drive shaft.

3. Shiftable transmission for driving a tachometric device at different speeds corresponding to different speeds of a vehicle shaft, comprising, in combination, a drive shaft; a tachometer shaft; transmission means connecting said shafts for rotating said tachometer shaft at a first speed; and electromagnetic coupling means shiftable between a disconnected position; an intermediate position, and a coupling position for directly coupling said shafts to rotate said tachometer shaft at a second speed, said coupling means including a first coupling member formed with circumferentially spaced openings, and coupling balls located in said openings, and a second coupling member having two concentric circular portions between which said annular portion and said balls are located, one of said concentric portions having coupling recesses for receiving said balls in said coupling position and the other concentric portion having two circular guide surfaces of different diameters arranged adjacent in axial direction and a conical connecting portion, the smaller guide surface holding said balls in said recesses, the large guide surface permitting free movement of said balls on said one concentric portion when said first coupling member is shifted to said disconnected position of said coupling means, and said conical portion being in contact with said coupling balls in said intermediate position for gradually increasing the speed of said tachometer shaft to approach the speed of said drive shaft.

4. Shiftable transmission for driving a tachometric device at different speeds corresponding to different speeds of a vehicle shaft, comprising, in combination, a drive shaft; a tachometer shaft; transmission means including a turnable member and connecting said shafts for rotating said tachometer shaft at a first speed; and coupling means shiftable between a disconnected position and a coupling position blocking rotation of said turnable member and for directly coupling said shafts to rotate said tachometer shaft at a second speed, said coupling means including a first coupling member turnable about one of said shafts and being mounted axially shiftable on the same, said first coupling member having an annular portion formed with circumferentially spaced openings, and coupling balls located in said openings, and a second coupling member operatively connected to said turnable member and having two concentric circular portions between which said annular portion and said balls are located, one of said concentric portions having coupling recesses for receiving said balls in said coupling position and the other concentric portion having two circular guide surfaces of different diameters arranged adjacent in axial direction, the smaller guide surface holding said balls in said recesses, and the large guide surface permitting free movement of said balls on said one concentric portion when said first coupling member is shifted to said disconnected position of said coupling means.

5. Shiftable transmission for driving a tachometric device at different speeds corresponding to different speeds of a vehicle shaft, comprising, in combination, a drive shaft; a tachometer shaft; transmission means connecting said shafts for rotating said tachometer shaft at a first speed; and electromagnetic coupling means shiftable between a disconnected position and a coupling position for directly coupling said shafts to rotate said tachometer shaft at a second speed, said coupling means including a first coupling member turnable about one of said shafts and being mounted axially shiftable on the same, said first bell-shaped coupling member having an annular portion formed with circumferentially spaced openings, and coupling balls located in said openings, and a second coupling member including two bell-shaped parts having, respectively, two concentric circular portions between which said annular portion and said balls are located, one of said concentric portions having coupling recesses for receiving said balls in said coupling position and the other concentric portion having two circular guide surfaces of different diameters arranged adjacent in axial direction, the smaller guide surface holding said balls in said recesses, and the large guide surface permitting free movement of said balls on said one concentric portion when said first coupling member is shifted to said disconnected position of said coupling means.

6. A transmission as set forth in claim 5 wherein said first coupling member is mounted on said tachometer shaft for axial and turning movement; and wherein the radius of said annular portion is at least twice the radius of said tachometer shaft.

7. A transmission as set forth in claim 5 wherein said coupling means includes an annular electromagnetic winding surrounding said tachometer shaft; and wherein said first coupling member includes a hub portion on said tachometer shaft having a tubular extension located in said winding and constituting an armature.

8. A transmission as set forth in claim 7 wherein said tubular extension has an inner shoulder; wherein said tachometer shaft has an abutment; and including a spring between said shoulder and said abutment and urging said first coupling member to move to said coupling position, said winding, when energized, moving said first coupling member to said disconnected position.

9. Shiftable transmission for driving a tachometric device at different speeds corresponding to different speeds of a vehicle shaft, comprising, in combination, a drive shaft adapted to be connected to a vehicle shaft; a tachometer shaft coaxial with said drive shaft; an orbit gear secured to said drive shaft for rotation therewith; a carrier member secured to said tachometer shaft; planetary gear means turnably mounted on said carrier member and meshing with said orbit gear; a first coupling member including a sun gear portion meshing with said planetary gear means and being mounted on said tachometer shaft for turning movement and shiftable in axial direction, said first coupling member including a bell-shaped part having a circular portion formed with circumferentially spaced openings, and balls mounted in said openings; a second coupling member secured to said carrier member for rotation therewith and having a circular portion formed with coupling recesses and a smooth circular surface adjacent the same; and means for shifting said first coupling member in axial direction between a coupling position in which said balls are located in said recesses and a disconnected position in which said balls are located on said smooth circular surface so that in said coupling position said drive shaft is directly connected to said tachometer shaft through said orbit gear, said planetary gears blocked by said sun gear portion, and said carrier member, whereas in said disconnected position said tachometer shaft is driven from said drive shaft at a selected transmission ratio through said orbit gear, said planetary gear means, and said carrier member.

10. Shiftable transmission for driving a tachometric device at different speeds corresponding to different speeds of a vehicle shaft, comprising, in combination, a drive shaft adapted to be connected to a vehicle shaft; a tachometer shaft coaxial with said drive shaft; an orbit gear secured to said drive shaft for rotation therewith; a carrier member secured to said tachometer shaft; planetary gear means turnably mounted on said carrier member and meshing with said orbit gear; a first coupling member including a sun gear portion meshing with said planetary gear means and being mounted on said tachometer shaft for turning movement and shiftable in axial direction, said first coupling member including a bell-shaped part having a circular portion formed with circumferentially spaced openings, and balls mounted in said openings; a second coupling member secured to said carrier member for rotation therewith and including two concentric circular portions between which said circular portion of said first coupling member is located, one of said concentric portions being formed with coupling recesses and having a smooth circular surface adjacent the same, and the other concentric portion having a first inner circular guide face opposite said recessed concentric portion, and a second inner circular guide face having a greater diameter than said first guide face and being located opposite said smooth circular surface; and electromagnetic means for shifting said first coupling member in axial direction between a coupling position in which said balls are located in said recesses held therein by said first guide face and a disconnected position in which said balls are located on said smooth circular surface and on said second guide face so that in said coupling position said drive shaft is connected to said tachometer shaft through said orbit gear, said planetary gears blocked by said sun gear portion, and said carrier member, whereas in said disconnected position said tachometer shaft is driven from said drive shaft at a selected transmission ratio through said orbit gear, said planetary gear means, and said carrier member.

11. A transmission as set forth in claim 10 wherein said sun gear portion of said first coupling member has a tubular extension constituting an armature; and wherein said electromagnetic means including a winding surrounding said tubular extension.

12. A transmission as set forth in claim 10 wherein said electromagnetic means includes a stationary member, and wherein said bell-shaped part of said first coupling member abuts said stationary member in said disconnected position to block rotation of said sun gear portion.

13. Shiftable transmission, comprising, in combination, a drive shaft; a driven shaft coaxial with said drive shaft; an orbit gear secured to said drive shaft for rotation therewith; a carrier member secured to said driven shaft; planetary gear means turnably mounted on said carrier member and meshing with said orbit gear; a first coupling member including a sun gear portion meshing with said planetary gear means and being mounted on said driven shaft for turning movement and shiftable in axial direction, said first coupling member including a part having a circular portion formed with circumferentially spaced openings, and rolling means mounted in said openings; a second coupling member secured to said carrier member for rotation therewith and having a circular portion formed with coupling recesses and a smooth circular surface adjacent the same; operating means for shifting said first coupling member in axial direction between a coupling position in which said rolling means are located in said recesses and a disconnected position in which said rolling means are located on said smooth circular surface; and a stationary member abutting said part of said first coupling member in said disconnected position to block rotation of said sun gear portion so that in said coupling position said drive shaft is connected to said driven shaft through said orbit gear, said planetary gears blocked by said sun gear portion, and said carrier member, whereas in said disconnected position said driven shaft is driven from said drive shaft at a selected transmission ratio through said orbit gear, said planetary gear means and said carrier member.

14. A transmission as set forth in claim 13 wherein said sun gear portion has a tubular extension constituting an armature; and wherein operating means includes an electromagnetic winding surrounding said tubular extension, and a spring abutting said extension and urging said first coupling member into said coupling position.

15. A transmission as set forth in claim 13 wherein said second coupling member includes a circular stepped guide surface surrounding said circular portion and said rolling means of said first coupling member, and being shaped for guiding said rolling means into said recesses.

References Cited in the file of this patent

UNITED STATES PATENTS

| | | |
|---|---|---|
| 2,464,129 | Goettisheim | Mar. 8, 1949 |
| 2,481,028 | Lear | Sept. 6, 1949 |
| 2,500,447 | Bitzer | Mar. 14, 1950 |
| 2,722,303 | Utz | Nov. 1, 1955 |